US012579818B2

(12) United States Patent
Murakami et al.

(10) Patent No.: US 12,579,818 B2
(45) Date of Patent: Mar. 17, 2026

(54) INFORMATION PROCESSING DEVICE, AND CONTROL PROGRAM

(71) Applicant: Faurecia Clarion Electronics Co., Ltd., Saitama (JP)

(72) Inventors: Tetsuro Murakami, Saitama (JP); Naoto Sakata, Saitama (JP); Miku Nagatsuka, Saitama (JP); Hiroshige Furugori, Saitama (JP); Masashi Koga, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 199 days.

(21) Appl. No.: 18/574,059

(22) PCT Filed: May 16, 2022

(86) PCT No.: PCT/JP2022/020442
§ 371 (c)(1),
(2) Date: Dec. 25, 2023

(87) PCT Pub. No.: WO2023/276470
PCT Pub. Date: Jan. 5, 2023

(65) Prior Publication Data
US 2024/0371170 A1 Nov. 7, 2024

(30) Foreign Application Priority Data
Jun. 30, 2021 (JP) ................................. 2021-109394

(51) Int. Cl.
 *G06V 20/56* (2022.01)
 *G06F 3/14* (2006.01)
 *G06T 11/00* (2006.01)

(52) U.S. Cl.
 CPC ................ *G06V 20/56* (2022.01); *G06F 3/14* (2013.01); *G06T 11/00* (2013.01)

(58) Field of Classification Search
None
See application file for complete search history.

(56) References Cited

U.S. PATENT DOCUMENTS 11,074,447 B1 * 7/2021 Fox ...................... G06V 10/454
2017/0309060 A1 * 10/2017 John ........................ G08G 5/80
(Continued)

FOREIGN PATENT DOCUMENTS

CA 3135960 A1 * 10/2020 ............. H04N 23/90
CN 110211243 B * 12/2023 ........... G06T 19/006
(Continued)

OTHER PUBLICATIONS

International Search Report of PCT/JP2022/020442 mailed on Jul. 19, 2022.
(Continued)

*Primary Examiner* — Ricky Chin
(74) *Attorney, Agent, or Firm* — IP Business Solutions, LLC

(57) ABSTRACT

An image generation device calculates a projection conversion matrix serving as a first conversion information enabling conversion of coordinates of a captured image from a coordinate system of the image to a coordinate system of a vehicle, calculates a projection conversion matrix serving as second conversion information enabling conversion of coordinates of a reference range to be displayed on a display unit from the coordinate system of the vehicle to a coordinate system of the display unit, and makes an image generation unit generate a display target image using the projection conversion matrices.

7 Claims, 13 Drawing Sheets

(56) References Cited

U.S. PATENT DOCUMENTS

| | | | | |
|---|---|---|---|---|
| 2018/0232097 | A1* | 8/2018 | Kneuper | G08G 5/53 |
| 2020/0056885 | A1* | 2/2020 | Rutkiewicz | G01S 17/933 |
| 2022/0373357 | A1* | 11/2022 | Ganille | G01C 23/005 |
| 2023/0134369 | A1* | 5/2023 | Auerbach | B64C 29/0008 |
| | | | | 348/144 |
| 2024/0371170 | A1* | 11/2024 | Murakami | G06V 20/56 |

FOREIGN PATENT DOCUMENTS

| | | | |
|---|---|---|---|
| JP | 2005-335410 | A | 12/2005 |
| JP | 2007-096638 | A | 4/2007 |
| JP | 2008-307982 | A | 12/2008 |
| JP | 2018-160868 | A | 10/2018 |

OTHER PUBLICATIONS

Written Opinion of the International Searching Authority of PCT/JP2022/020442 mailed on Jul. 19, 2022.
The Japanese Office Action mailed by Japanese Patent Office dated on Mar. 25, 2025 in corresponding Japanese patent application No. 2021-109394.
International Preliminary Report on Patentability of PCT/JP2022/020442 issued on Dec. 14, 2023.

* cited by examiner

INFORMATION PROCESSING DEVICE, AND CONTROL PROGRAM

CROSS-REFERENCE TO RELATED APPLICATIONS

This is the U.S. National Phase under 35 U.S.C. 371 of International Application No. PCT/JP2022/020442, filed on May 16, 2022, which in turn claims the benefit of Japanese Patent Application No. 2021-109394, filed on Jun. 30, 2021, the disclosures of which are incorporated by reference herein.

BACKGROUND OF THE INVENTION

Field of the Invention

The present invention relates to an information processing device and to a control program.

Description of the Related Art

An information processing device that is installed in a vehicle and capable of displaying an image that augments the field of view of a driver has been proposed.

For example, Patent Document 1 describes a vehicle surroundings image providing device that performs coordinate conversion on an image captured by an image capturing device to display on a liquid crystal display, an image that is the same as the image of the outside of the vehicle as seen through an installation area of the liquid crystal display from a viewpoint position of a driver.

PRIOR ART DOCUMENTS

Patent Documents

Patent Document 1: Japanese Unexamined Patent Application 2007-096638

SUMMARY OF THE INVENTION

Problem to be Solved by the Invention

However, Patent Document 1 does not clearly provide a specific method of setting a region, in the image captured by the image capturing device, to be displayed is not clear, nor a specific method of performing the coordinate conversion and displaying the image captured by the imaging device.

Unless the generation of the image in the range visible from the occupant and the association of the image with a display unit such as the liquid crystal display are accurately implemented, the displayed image and the scenery directly viewed by the occupant fail to be continuous, and thus the occupant may feel unnaturalness.

The present invention has been made in view of the above circumstances, and an object of the present invention is to enable displaying of a see-through image capable of suppressing unnaturalness felt by an occupant.

Means for Solving the Problem

This specification includes the entire contents of Japanese Patent Application No. 2021-109394 filed on Jun. 30, 2021.

An information processing device of the present invention for achieving the above object includes: an information acquisition unit configured to acquire a captured image of a surrounding of a moving body; a display processing unit configured to make a display unit viewable by an occupant of the moving body, display a display target image; a first conversion information acquisition unit configured to acquire first conversion information enabling conversion of coordinates of the captured image from an image coordinate system into a coordinate system of the moving body; a reference range calculation unit configured to identify a projection center corresponding to a viewpoint of the occupant of the moving body, and calculate a reference range on a set plane set by the coordinate system of the moving body to be projected in a display range of the display unit, based on the projection center; a second conversion information acquisition unit configured to calculate second conversion information enabling conversion of coordinates of the reference range from the coordinate system of the moving body into a coordinate system of the display unit; and an image generation unit configured to calculate each pixel value in a display range of the display unit from each pixel value of the captured image corresponding to the reference range by using the first conversion information and the second conversion information, and generate the display target image by using each pixel value calculated.

Effect of the Invention

According to the present invention, it is possible to display a see-through image capable of suppressing unnaturalness felt by an occupant.

DETAILED DESCRIPTION OF THE INVENTION

Hereinafter, embodiments will be described with reference to the accompanying drawings.

Figure 1:
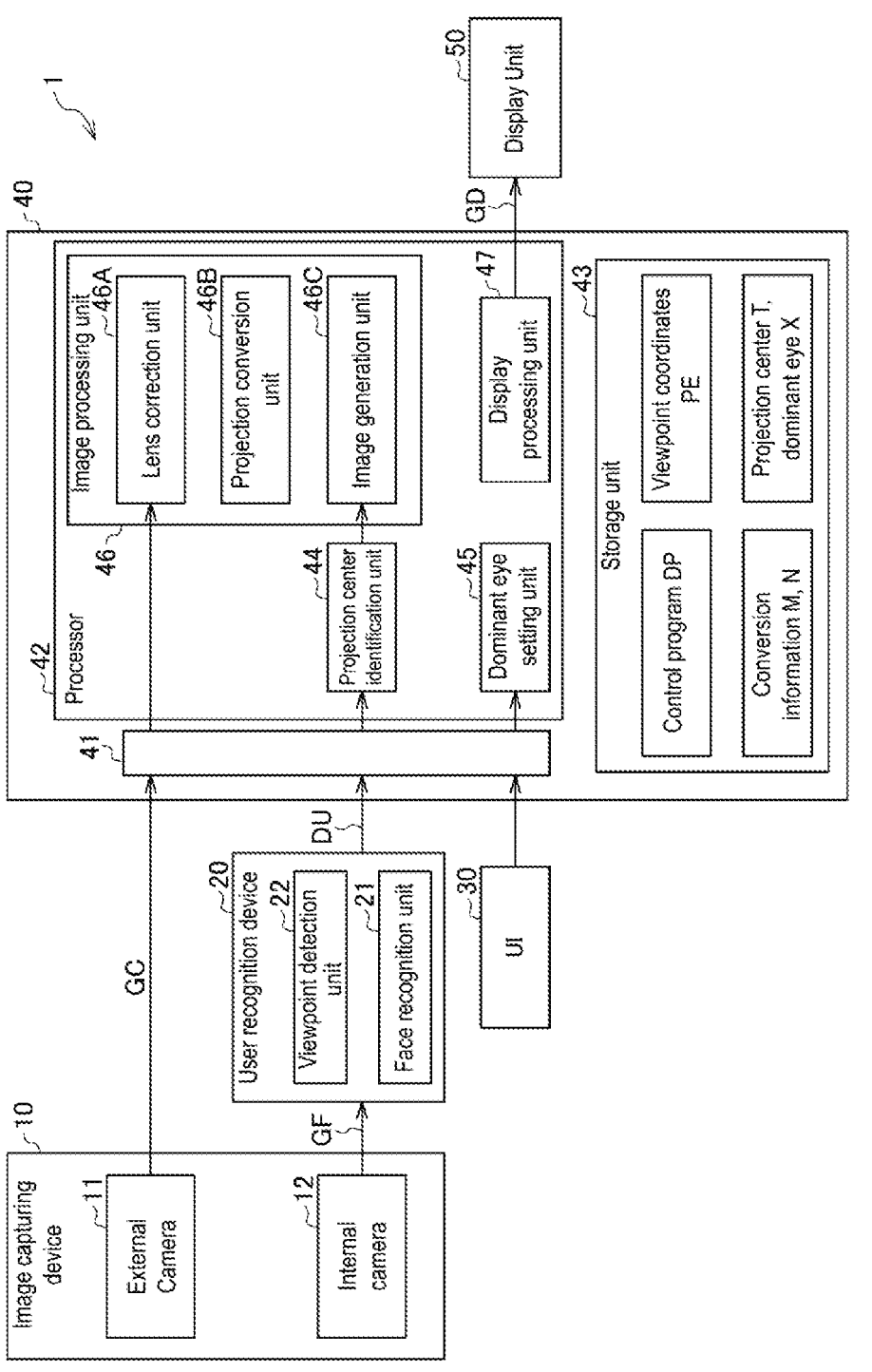
FIG. 1 is a diagram illustrating a configuration of a display control system according to an embodiment of the present invention.

FIG. 1 is a block diagram illustrating a configuration of a display control system 1 according to an embodiment of the present invention.

The display control system 1 includes an image capturing device 10, a user recognition device 20, a user interface 30 (hereinafter referred to as "UI 30"), an image generation device 40, and a display unit 50.

The display control system 1 is a system installed in a vehicle 2 (FIG. 2), and each member constituting the display control system 1 can also be referred to as an in-vehicle device. The vehicle 2 is a moving body that moves together with a user US who is an occupant, and is a four wheeled vehicle referred to an automobile in the present embodiment. However, the vehicle 2 may be a vehicle other than a four wheeled vehicle or may be a moving body other than a vehicle.

Figure 2:
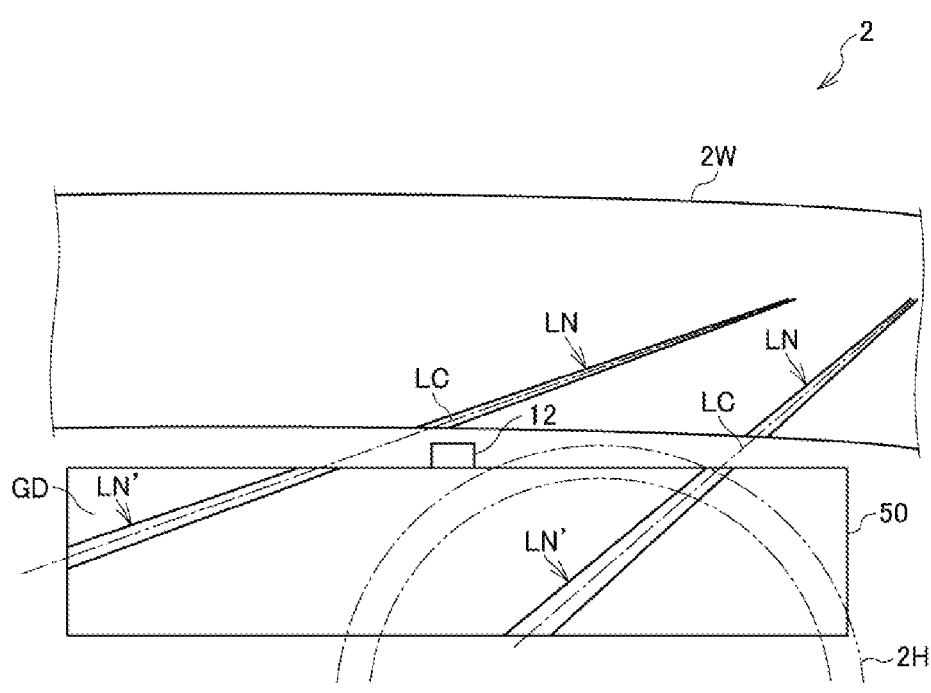
FIG. 2 is a diagram schematically illustrating an area around a driver seat of a vehicle in which the display control system is installed.

FIG. 2 is a diagram schematically illustrating an area around a driver seat of the vehicle 2 in which the display control system 1 is installed. FIG. 2 depicts a part of a vehicle interior as viewed from a user US (driver) seated on the driver seat. As illustrated in FIG. 2, the vehicle 2 includes a front window 2W, a steering wheel 2H operated by the user US, and the display unit 50 provided on a dashboard in front of the steering wheel 2H. An internal camera 12 of the image capturing device 10 is disposed near the display unit 50. The size and position of the display unit 50 and the position and size of the internal camera 12 may be changed as appropriate.

The display unit 50 is disposed in front of the user US and below the front window 2W, is visible by the user US, and has a wide display screen extending in the vehicle-width direction. The display unit 50 displays an image generated by the image generation device 40, in other words, displays an output image of the image generation device 40.

Widely distributed display devices such as a liquid crystal display device can be widely applied to the display unit 50. In the present embodiment, the display unit 50 is configured as a single display device, but the display unit 50 may include a plurality of display devices.

The user US driving the vehicle 2 visually recognizes the scenery around the vehicle including the front side of the vehicle through the front window 2W.

The display control system 1 is a system for capturing an image of a scenery around the vehicle using an external camera 11 of the image capturing device 10, converting a captured image GC into a see-through image GD which is visible as viewed from a user US through the display unit 50, and displaying the see-through image GD on the display unit 50. Thus, the see-through image GD is a display target image, and is also an output image output from the image generation device 40. The see-through image GD can also be regarded as a viewpoint conversion image matched with the viewpoint of the user US, and can also be regarded as a field-of-view augmented image augmenting the field of view of the user US to be useful for driving support.

Hereinafter, for convenience of description, the image displayed on the display unit 50 is referred to as a "display target image GD".

FIG. 2 depicts a case where two lines LN extend linearly on the ground in front of the vehicle. In the present embodiment, the highly accurate display target image GD is generated in accordance with the viewpoint of the user US. Thus, as illustrated in FIG. 2, each line LN visually recognized through the front window 2W and each line LN' displayed on the display unit 50 can be displayed to be aligned on a straight line. Therefore, a region that cannot be directly viewed by the driver can be accurately displayed for the sake of suitable driving support.

In FIG. 2, the center line of each line LN is denoted by the reference sign LC. As illustrated in FIG. 2, since the center line LC of each line LN coincides with the center line of each line LN' to be displayed, the lines LN and LN' are continuous with each other so as not to be felt unnatural by the user US.

Figure 3:
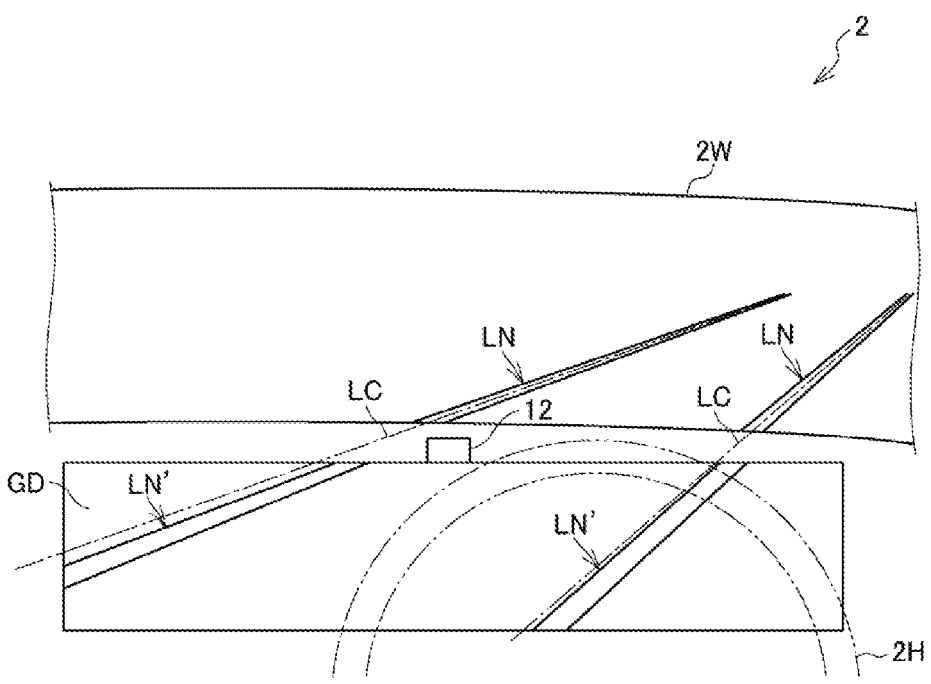
FIG. 3 is a diagram illustrating the area around the driver seat of the vehicle when a highly accurate display target image has failed to be generated.

FIG. 3 is a diagram illustrating the area around the driver seat of the vehicle 2 when the highly accurate display target image GD has failed to be generated. As illustrated in FIG. 3, as viewed from the user US, each line LN' displayed on the display unit 50 is displayed so as to be deviated from each line LN visually recognized through the front window 2W. Thus, the scenery viewed by the user US through the front window 2W and the display target image GD displayed on the display unit 50 are not continuous, and may be felt unnatural by the user US. In addition, since the image is not an accurate image for augmenting the field of view of the driver, and thus may not be an image suitable for driving support.

As illustrated in FIG. 1, the image capturing device 10 includes the external camera 11 that captures an image of the surroundings of the vehicle 2 and the internal camera 12 that captures an image of the user US in the vehicle. The external camera 11 captures an image of the ground at least in front of the user US in the vehicle, and behind an area that the user US sees through the front window 2W. Data of the captured image GC captured by the external camera 11 is output to the image generation device 40.

As illustrated in FIG. 2, the internal camera 12 is disposed in front of the user US, and thus can capture an image including both eyes and a face of the user US. Data of the captured image GF captured by the internal camera 12 is output to the user recognition device 20. Widely distributed image capturing devices can be applied to the external camera 11 and the internal camera 12.

The user recognition device 20 includes a face recognition unit 21 that recognizes the face of the user US using the captured image GF, and a viewpoint detection unit 22 that detects the viewpoint of the user US using the captured image GF. The face recognition unit 21 uses known image recognition technology to recognize the position of the face of the user US. the orientation of the face, each part of the face (including the eyes), a motion of the user US with respect to the face, and the like. The motion of the user related to the face is, for example, winking, nodding, or the like.

The viewpoint detection unit 22 detects viewpoint coordinates PE which are the viewpoint position of the user US by using the recognition result of the face recognition unit 21. The viewpoint detection unit 22 may directly detect the viewpoint coordinates PE of the user US from the captured image GF without using the face recognition result from the face recognition unit 21.

Figure 4:
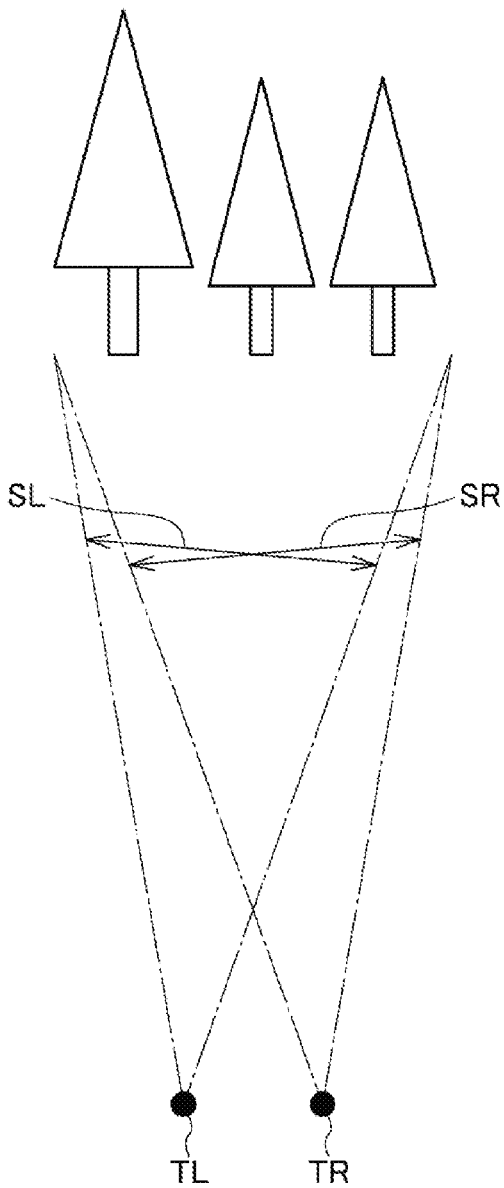
FIG. 4 is a diagram illustrating viewpoint positions of both eyes and regions viewed from the respective viewpoint positions.

As illustrated in FIG. 4, the viewpoint detection unit 22 detects a viewpoint position TL of the left eye and a viewpoint position TR of the right eye as the viewpoint coordinates PE. The viewpoint positions TL and TR can also be referred to as the positions of the left and right eyes, and are information used to identify a range to be displayed on the display unit 50. Strictly speaking, the viewpoint positions TL and TR are preferably positions at which the user US recognizes an image, and are preferably positions on the left and right retinas at which light from the outside is converted into the image, for example.

As illustrated in FIG. 4, since the viewpoint positions TL and TR are spaced apart from each other in the left-right direction, regions SL and SR respectively viewed from the viewpoint positions TL and TR are slightly different from each other. Detection results of the face recognition unit 21 and the viewpoint detection unit 22 are output to the image generation device 40 as user information DU.

As described above, the user recognition device 20 identifies at least the viewpoint positions TL and TR of the user US using the captured image GF from the internal camera 12, and outputs the user information DU with which at least the viewpoint positions TL and TR can be identified, to the image generation device 40.

FIG. 1 illustrates a case where the user recognition device 20 and the image generation device 40 are separate components, but the user recognition device 20 and the image generation device 40 may be integrated.

The UI 30 is an interface for inputting an instruction of the user US, and includes a known user interface such as an operation button, a touch panel, and a voice input device. The user instruction input via the UI 30 is input to the image generation device 40.

While FIG. 1 illustrates the display control system 1 in which the imaging device 10, the user recognition device 20, the UI 30, the image generation device 40, and the display unit 50 are separate components, the configuration is not limited thereto. For example, at least one of the image capturing device 10, the user recognition device 20, the UI 30, and the display unit 50 may be configured to be integrated with the image generation device 40.

As illustrated in FIG. 1, the image generation device 40 includes an input interface 41 (hereinafter, referred to as "input I/F 41"), a processor 42, and a storage unit 43, and functions as an information processing device that executes processing related to generation and displaying of an image. The input I/F 41 is a part including a hardware environment for connecting to predetermined devices such as the user recognition device 20, the image capturing device 10, and the UI 30, and having a function of transmitting and receiving signals to and from each of the devices in accordance with a predefined protocol. The signals inputted by the input I/F 41 are outputted to the processor 42 of the image forming apparatus 40. The input I/F 41 corresponds to an "information acquisition unit" of the present invention.

The processor 42 is an arithmetic processing device including a central processing unit (CPU), a micro processing unit (MPU), and the like. The processor 42 operates in accordance with a control program DP stored in the storage unit 43 to function as a projection center identification unit 44, a dominant eye setting unit 45, an image processing unit 46, a display processing unit 47, and the like.

The processor 42 can also be regarded as a computer that controls the operation of the image generation device 40. The processor 42 controls the operation of the image generation device 40, thereby controlling the operation of the display control system 1 as a whole. Thus, the processor 42 can be regarded as a computer that controls the operation of the display control system 1.

The processor 42 may be configured by a single processor or by a plurality of processors. The processor 42 may be configured by a system-on-a-chip (SoC) integrated with a part or all of the storage unit 43 and other circuits. The processor 42 may be configured by a combination of a CPU that executes a program and a DSP that executes predetermined arithmetic processing. Furthermore, all of the functions of the processor 42 may be implemented by hardware, or may be configured using a programmable device.

In addition to the control program DP, the storage unit 43 stores the previous viewpoint coordinates PE detected by the viewpoint detection unit 22, a previous projection center T identified by the projection center identification unit 44, a dominant eye X set by the dominant eye setting unit 45, and data related to the conversion information M and N. A known storage device can be widely applied to the storage unit 43.

Here, the conversion information M is first conversion information that enables conversion of the coordinates of the captured image GF from the coordinate system of the image data to the coordinate system of the vehicle 2, and more specifically, is a projection conversion matrix M described later. The conversion information N is second conversion information that enables conversion of the image displayed on the display unit 50 in the captured image GF from the coordinate system of the vehicle 2 to the coordinate system of the display unit 50, and more specifically, is a projection conversion matrix N to be described later.

The projection center identification unit 44 sets the projection center T corresponding to the viewpoint of the user US based on the viewpoint coordinates PE detected by the viewpoint detection unit 22 and the like. In the present embodiment, the projection center T is defined as one point, the display region of the display unit 50 is set as a projection surface, and an image projected from the projection center T onto the projection surface is generated as the display target image GD.

Since a person has two eyes, i.e., two viewpoints, if the projection center T is set to one point, it is theoretically impossible to completely reproduce an image of an object viewed by a person. As a compromise, the midpoint of both eyes may be set as the projection center T, but the unnaturalness remains. On the other hand, information obtained from which eye for vision is preferentially processed differs depending on a person.

Therefore, in the present embodiment, in order to reduce the unnaturalness, the dominant eye X of the user US is set by the dominant eye setting unit 45, and the projection center T reflecting the dominant eye X is set. It should be noted that the dominant eye is one of the left and right eyes that achieves better recognition.

In the present embodiment, the dominant eye setting unit 45 performs dominant eye setting processing for setting the dominant eye X of the user. The dominant eye setting processing will be described later.

The image processing unit 46 includes a lens correction unit 46A, a projection conversion unit 46B, and an image generation unit 46C. The lens correction unit 46A performs correction processing for correcting distortion of a lens of the external camera 11, on the captured image GC acquired via the input I/F 41. The distortion of the lens includes distortion aberration, chromatic aberration, and the like of the lens for example. Known correction processing may be applied to the processing for correcting the distortion of the lens.

Figure 5:
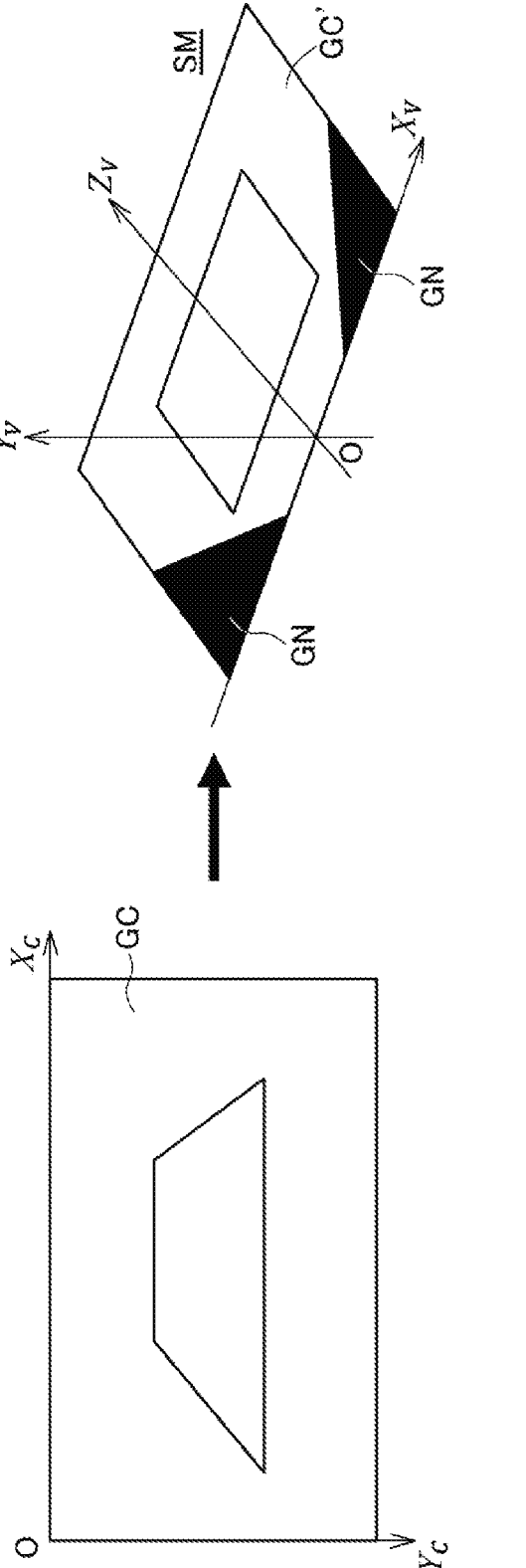
FIG. 5 is a diagram illustrating a supplementary explanation for the explanation of first conversion processing.

FIG. 5 is a supplementary diagram for facilitating understanding of first conversion processing described later.

In FIG. 5, the image coordinate system of the corrected captured image GC is represented by two axes including a horizontal axis Xc and a vertical axis Yc, and the vehicle coordinate system is represented by three axes including Xv, Yv, and Zv.

The image coordinate system is a coordinate system based on the captured image GC, and is a two-dimensional coordinate system with the origin O at the upper left corner of the captured image GC. The unit of each axis is pixel (px).

The vehicle coordinate system is a coordinate system based on the vehicle 2 and is a three-dimensional coordinate system with the origin defined at the location of the vehicle 2. Xv is an axis extending in the vehicle-width direction, Yv is an axis extending in the vehicle-vertical direction, and Zv is an axis extending in the vehicle forward direction, and the unit of each axis is mm. In the present embodiment, a set plane SM is set to be a plane corresponding to the ground on which the vehicle 2 travels (which can also be referred to as a traveling surface). The set plane SM can also be referred to as a field of view augmentation target plane or a plane to be visually recognized by the user US.

As illustrated in FIG. 5, the projection conversion unit 46B calculates a projection conversion matrix M for mapping the corrected captured image GC onto the set plane SM (the plane with the coordinate on the Yv axis being at the height corresponding to the ground). A region indicated by a reference sign GN in FIG. 5 is a region to which an image in the captured image GC is not mapped, and thus is a region outside the captured image GC.

The projection conversion unit 46B calculates a reference range (corresponding to a range of the traveling surface) to be displayed on the display unit 50.

Figure 6:
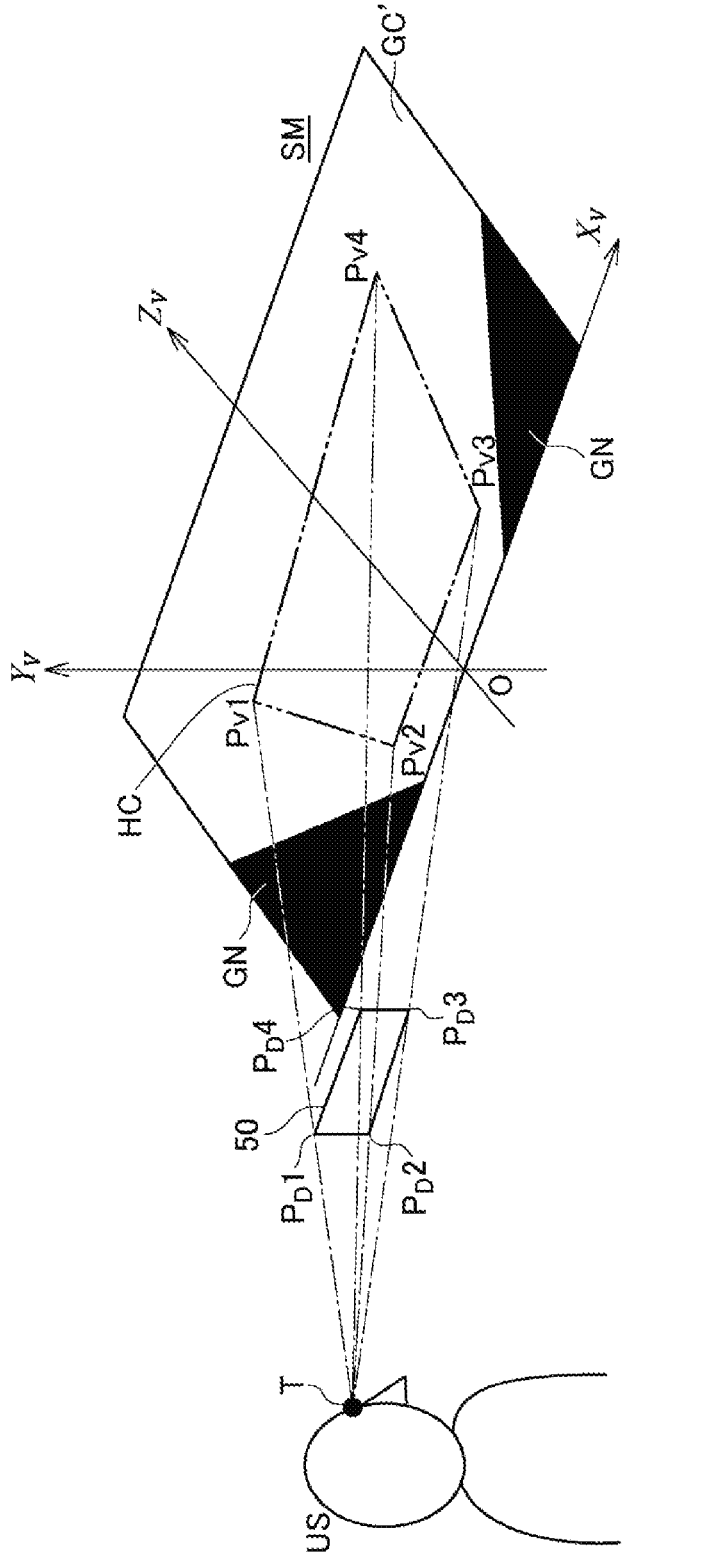
FIG. 6 is a diagram illustrating details of processing by a projection conversion unit.

FIG. 6 is a diagram illustrating the content of the processing by the projection conversion unit 46B.

As illustrated in FIG. 6, the projection conversion unit 46B calculates a range, on the set plane SM set by the vehicle coordinate system, to be projected onto the display range of the display unit 50 (range defined by coordinates PD1 to PD4) that is a projection surface, based on the projection center T.

More specifically, the projection conversion unit 46B calculates the coordinates V1 to V4 using the coordinates of the projective center T and the coordinates PD1 to PD4.

In the present embodiment, a range HC defined by the coordinates Pv1 to Pv4 is referred to as the reference range, and an image within the reference range (range HC) corresponds to an image to be displayed on the display unit 50. In the present embodiment, the projection center identification unit 44 and the projection conversion unit 46B correspond to a "reference range calculation unit" of the present invention.

The image generation unit 46C uses the captured image GC to generate an image corresponding to an image in the reference range (range HC), and thus generates image data of the display target image GD. Based on the image data generated by the image generation unit 46C, the display processing unit 47 executes processing of displaying an image corresponding to the image data on the display unit 50.

To generate the display target image GD to be displayed on the display unit 50 from the captured image GC captured by the external camera 11, first conversion processing of highly-accurately converting the coordinates of the captured image GC from the coordinate system of the image GC to the coordinate system of the vehicle 2, and second conversion processing of highly-accurately converting the coordinates of the reference range HC to the coordinate system of the display unit 50.

The information required for the first conversion processing is as follows.

Figure 7:
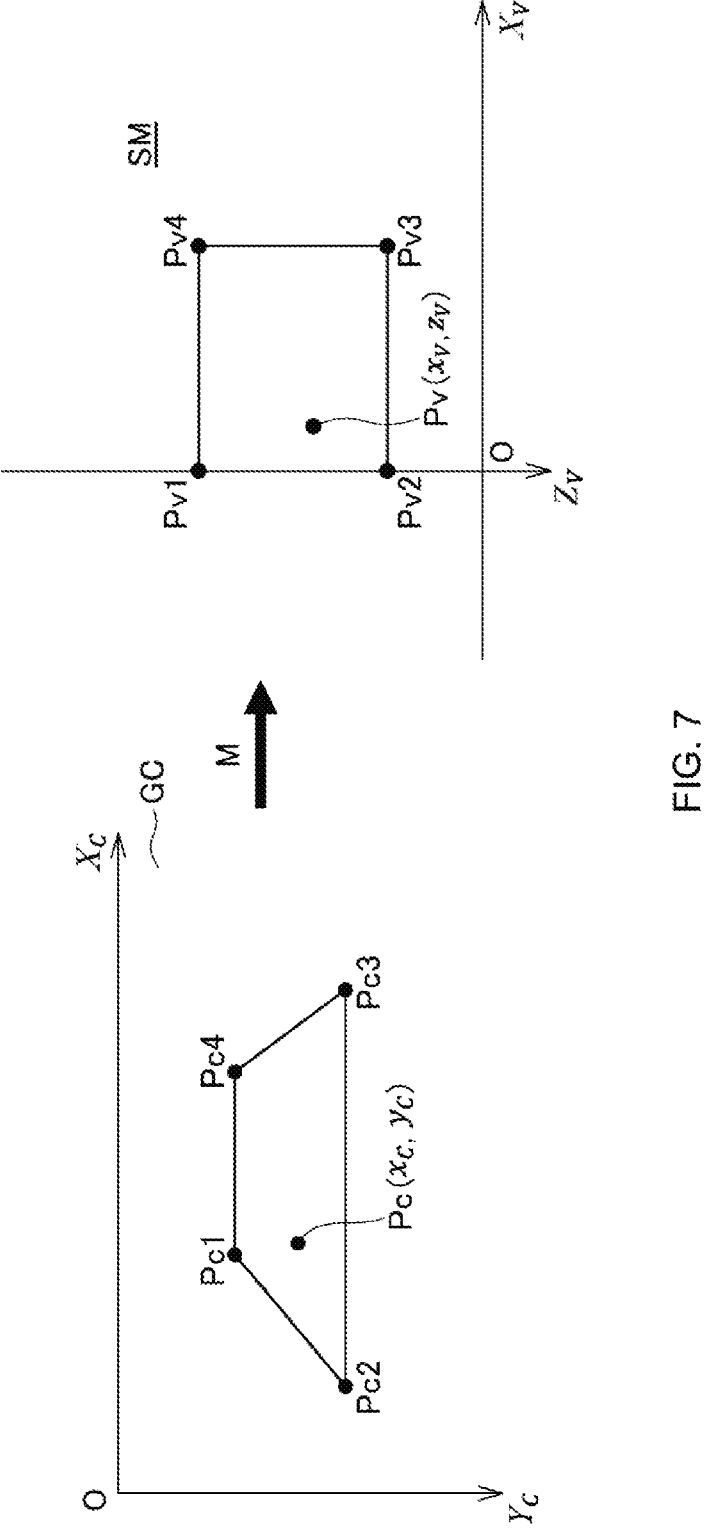
FIG. 7 is a diagram for explaining the first conversion processing.

As illustrated in FIG. 7, reference points in the captured image GC in the image coordinate system are defined as points Pc1, Pc2, Pc3, and Pc4, and homogeneous coordinates representing coordinates (xc,yc) in the image coordinate system are defined as Pc. On the set plane SM (a plane corresponding to the ground) in the vehicle coordinate system, reference points corresponding to the reference points Pc1 to Pc4 are defined as points Pv1, Pv2, Pv3, and Pv4, and homogeneous coordinates representing coordinates (xv,zv) in the vehicle coordinate system are defined as Pv. These reference points Pc1 to Pc4 and the reference points Pv1 to Pv4 are used for calculating the projection conversion matrix M to be described later.

The relationship between the homogeneous coordinates Pc and Pv can be expressed by Equation (1).

[Equation 1]

$$\begin{pmatrix} \lambda_V x_V \\ \lambda_V z_V \\ \lambda_V \end{pmatrix} = M \begin{pmatrix} x_C \\ y_C \\ 1 \end{pmatrix} \quad \text{Equation (1)}$$

In the equation, M represents the projection conversion matrix M for converting the coordinates of the image coordinate system into the coordinates of the vehicle coordinate system, and corresponds to "first conversion information" of the present invention.

The projection conversion matrix M can be calculated by the following procedure.

The four points Pv1, Pv2, Pv3, and Pv4 in the coordinate system of the vehicle 2 that are points captured on the captured image GC obtained with the distortion of the lens of the external camera 11 corrected are defined, and coordinates of each of the points Pv1 to Pv4 are identified through actual measurement. Next, the coordinates of the four points Pc1, Pc2, Pc3, and Pc4 in the image coordinate system are identified. In this case, the coordinates of the points Pc1 to Pc4 are identified on the captured image GC obtained with the distortion of the lens of the external camera 11 corrected. The projection conversion matrix M is calculated by substituting these identified coordinates into Formula (1) and solving a simultaneous equation involving each element of the projection conversion matrix M. The calculated projection conversion matrix M is stored, for example, in the storage unit 43 as the conversion information M.

The processing of calculating the projection conversion matrix M may be performed by using the arithmetic processing function of the processor 42. When the processor 42 calculates the projection conversion matrix M, the processor 42 functions as a "first conversion information acquisition unit" according to the invention.

The projection conversion matrix M may be calculated by a device having the arithmetic processing function, other than the image generation device 40. In this case, the calculated projection conversion matrix M may be acquired by the image generation device 40 via the input I/F 41 and stored in the storage unit 43. In this case, the input I/F 41 functions as the "first conversion information acquisition unit" of the present invention. The input I/F 41 may have a communication function for connecting to a predetermined communication network.

The information required for the second conversion processing is as follows.

Figure 8:
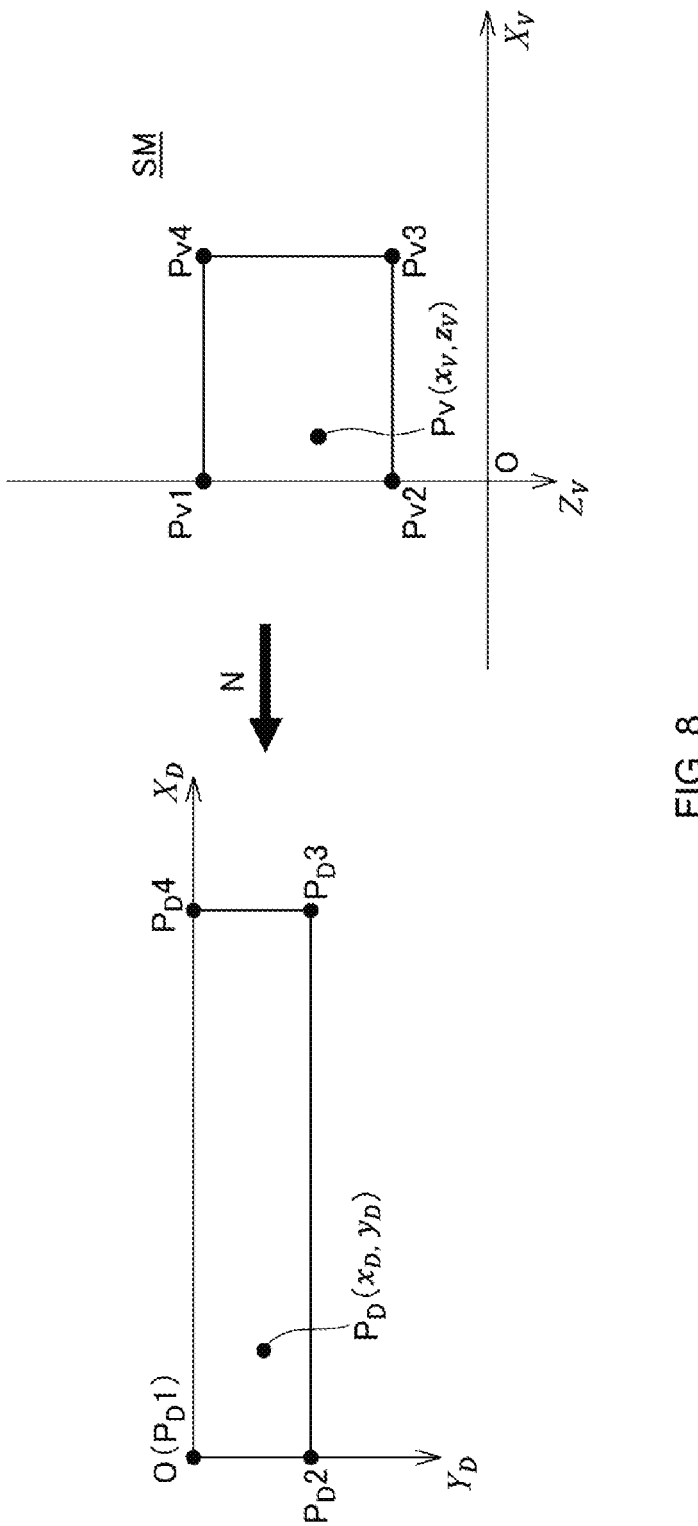
FIG. 8 is a diagram for explaining second conversion processing.

As illustrated in FIG. 8, the reference range calculated by the projection conversion unit 46B on the set plane SM in the vehicle coordinate system is defined as the range of the points Pv1, Pv2, Pv3, and Pv4, and homogeneous coordinates representing the coordinates (xv,zv) in the vehicle coordinate system are defined as Pv. In the coordinate system of the display unit 50, reference points corresponding to the reference points Pv1 to Pv4 are defined as the points PD1, PD2, PD3, and PD4, and homogeneous coordinates representing coordinates (xD,yD) in the coordinate system of the display unit 50 are defined as PD. The coordinate system of the display unit 50 is a coordinate system based on the display unit 50, and is a two-dimensional coordinate system in which the origin O is at the upper left corner of the display unit 50, the horizontal axis is defined as XD, and the vertical axis is defined as YD, and the unit is pixel (px). The points Pv1 to Pv4 and points PD1 to PD4 are used to calculate the projection conversion matrix N.

The relationship between the homogeneous coordinates Pv and PD can be expressed by Equation (2).

[Equation 2]

$$\begin{pmatrix} \lambda_D x_D \\ \lambda_D y_D \\ \lambda_D \end{pmatrix} = N \begin{pmatrix} \lambda_V x_V \\ \lambda_V z_V \\ \lambda_V \end{pmatrix} \qquad \text{Equation (2)}$$

In the equation, N is the projection conversion matrix for converting coordinates in the vehicle coordinate system into coordinates of the display unit 50, and corresponds to "second conversion information" of the present invention.

Note that values $\lambda$v, $\lambda$D in Equations (1) and (2) indicate the magnification factor at the homogeneous coordinates Pv and PD, respectively. Regardless of the values $\lambda$v and $\lambda$D, other than 0, each homogeneous coordinate represents the same coordinate on each coordinate system.

The product H (=NM) of the projection conversion matrix M and the projection conversion matrix N is a projection conversion matrix for converting the coordinates (xc,yc) of the image coordinate system into the coordinates (xD,yD) of the display unit 50. The relational expression using the projection conversion matrix H is as expressed in Equation (3). With the projection conversion matrix H obtained in advance, the coordinate conversion between the coordinates on the image coordinate system and the coordinates on the display unit 50 can be easily performed.

[Equation 3]

$$\begin{pmatrix} \lambda_D x_D \\ \lambda_D y_D \\ \lambda_D \end{pmatrix} = H \begin{pmatrix} x_C \\ y_C \\ 1 \end{pmatrix} \qquad \text{Equation (3)}$$

$$H = MN$$

Figure 9:
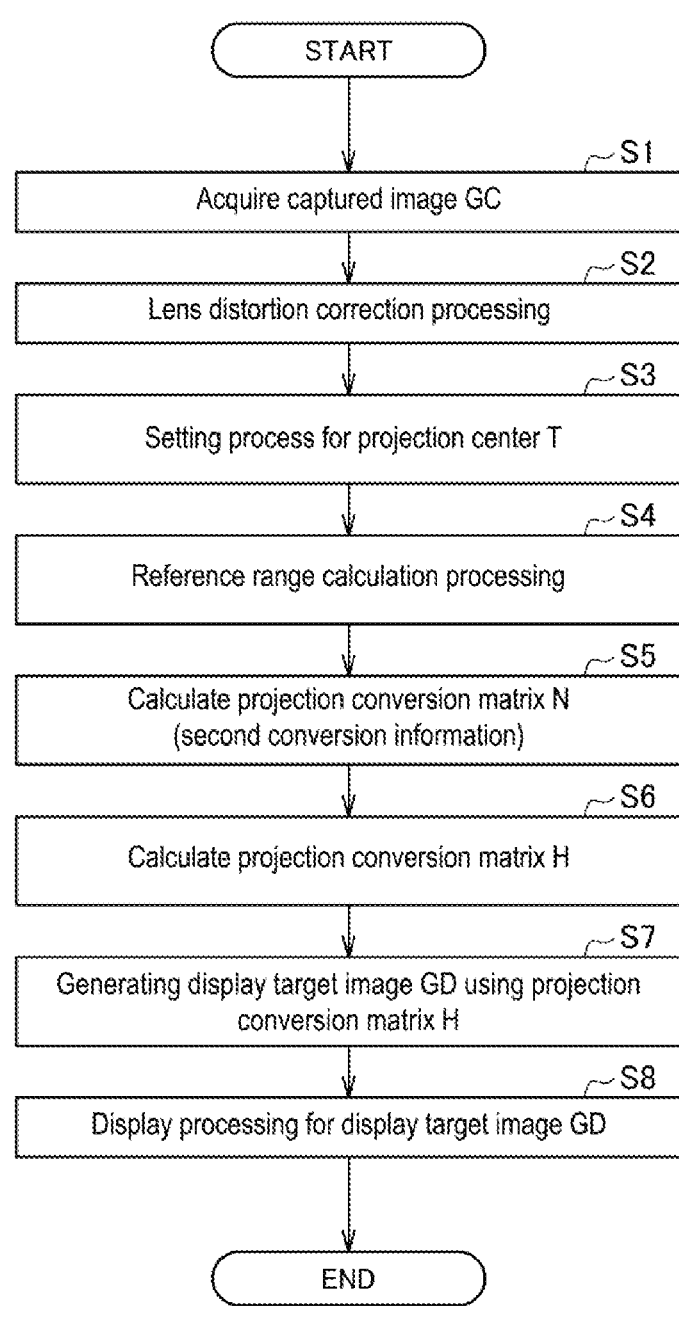
FIG. 9 is a flowchart illustrating processing of generating a display target image.

FIG. 9 is a flowchart illustrating processing of generating the display target image GD executed by the image generation device 40.

In Step S1, the image generation device 40 acquires the captured image GC captured by the external camera 11 via the input I/F 41. In Step S2, the image generation device 40 uses the lens correction unit 46A to execute correction processing to correct lens distortion, for the captured image GC.

In Step S3, the image generation device 40 uses the projection center identification unit 44 to execute setting processing of setting the projection center T based on the viewpoint coordinates PE of the user US and the dominant eye X set by the dominant eye setting unit 45.

In Step S4, the image generation device 40 uses the projection conversion unit 46B to calculate the reference range to be displayed on the display unit 50, to calculate the coordinates PD1 to PD4 of the four corners of the display unit 50 and the coordinates Pv1 to Pv4 of the four corners of the reference range illustrated in FIGS. 6 and 8.

In Step S5, the image generation device 40 uses the projection conversion unit 46B to substitute the coordinates PD1 to PD4 on the coordinate system of the display unit 50 and the coordinates Pv1 to Pv4 on the vehicle coordinate system into Equation (2), and solve simultaneous equations including the elements of the projection conversion matrix N, to calculate the projection conversion matrix N. The calculated projection conversion matrix N is stored, for example, in the storage device 43, as the conversion information N.

In Step S6, the image generation device 40 uses the projection conversion unit 46B to calculate a product H (hereinafter, referred to as a projection conversion matrix H) of the projection conversion matrix N and the projection conversion matrix M. The projection conversion unit 46B corresponds to a "second conversion information acquisition unit" of the present invention.

Although the case where the projection conversion unit 46B calculates the projection conversion matrices N and M is described as an example, the present invention is not limited to this configuration. The processing of calculating the projection conversion matrices N and M may be executed using the arithmetic processing function of the processor 42. In addition to the processor 42, a device for calculating the projection conversion matrices N and M may be separately provided. The projection conversion matrix H may be stored in the storage unit 43.

In Step S7, the image generation unit 46C of the image generation device 40 calculates the pixel value of each pixel of the display unit 50 from the pixel value of the pixel of the captured image GC corresponding to the pixel value using the projection conversion matrix H, generates data of output image based on the calculated pixel values, and outputs image data of the display target image GD.

A known technique may be applied to the processing of calculating the pixel values of the pixels of the display unit 50 from the pixel values of the pixels of the captured image GC. The pixel value of each pixel of the display unit 50 may be calculated from the pixel values of a plurality of pixels as a combination of the peripheral pixels of the pixel of the captured image GC corresponding to the pixel value.

In Step S8, the image generation device 40 uses the display processing unit 47 to display an image corresponding to the display target image GD on the display unit 50.

Figure 10:
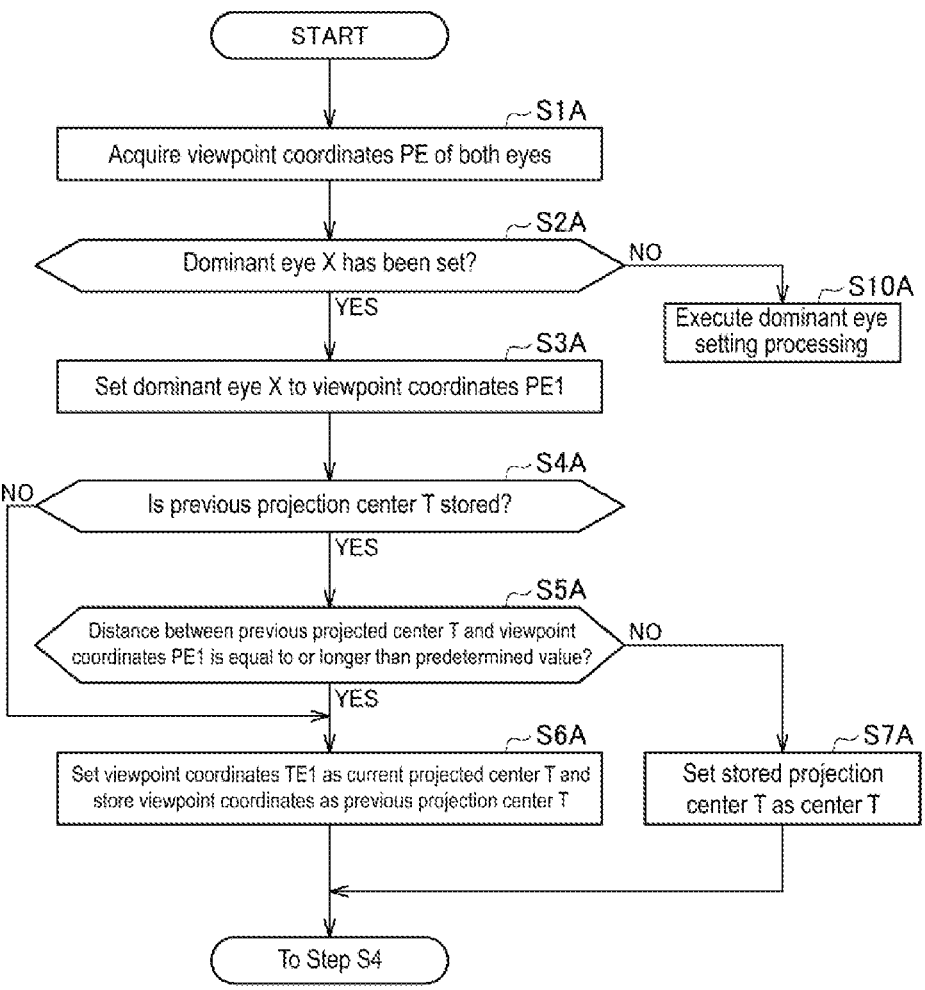
FIG. 10 is a flowchart illustrating processing in Step S3.

The processing in Step S3 will be further described with reference to FIG. 10.

In Step S1A, the projection center identification unit 44 acquires the viewpoint coordinates PE of both eyes detected by the viewpoint detecting unit 22 via the input I/F 41. In Step S2A, the projection center identification unit 44 determines whether information identifying the dominant eye X has been stored in the storage unit 43, thereby determining whether the dominant eye X has been set. When dominant eye X has not been set (Step S2A; NO), a projection center identification unit 44 executes the dominant eye setting processing for setting the dominant eye (Step S10A).

When the dominant eye X has been set (Step S2A; YES), the projection center identification unit 44 sets the position of the dominant eye X as viewpoint coordinates PE1 (Step S3A).

In the next Step S4A, the projection center identification unit 44 determines whether the previous projection center T is stored in the storage unit 43. When the previous projection center T is stored (Step S3A; YES), the projection center identification unit 44 calculates a distance between the previous projection center T and the viewpoint coordinates PE1, and determines whether the distance is equal to or longer than a predetermined threshold (Step S5A).

The distance equal to or longer than the threshold corresponds to a case where the viewpoint of the user US has relatively largely moved from the previous point. In other words, the distance corresponds to a case where when the reference range is set using the projection center T of the previous time and the image (display target image GD) corresponding to the reference range is displayed on the display unit 50, the deviation between the image (display target image GD) and the scenery directly viewed by the occupant overwhelms the allowable range. That is, the threshold is set to make the deviation fall within the allowable range. When the image displayed on the display unit 50 is changed in response to a slight deviation of the viewpoint, there is a concern that the image displayed on the display unit 50 may appear to be vibrating. With the threshold thus set, the vibration can be suppressed.

When the distance is equal to or longer than the threshold (Step S5A; YES) or when the previous projection center T is not stored (Step S3A; NO), the projection center identification unit 44 sets the viewpoint coordinates PE1 as the current projection center T and stores the viewpoint coordinates PE1 as the previous projection center T in the storage unit 43 (Step S6A). Thus, the projection center T stored in the storage unit 43 is updated.

On the other hand, when the distance is shorter than the threshold (Step S5A; NO), the previous projection center T stored in the storage unit 43 is set as the current projection center T (Step S7A). Therefore, when the viewpoint of the user US is almost the same as the previous viewpoint, the previous projection center T is used as the current projection center T1, and the rewriting processing for the storage unit 43 needs not to be executed. The processing in Step S3 is as described above.

Figure 11:
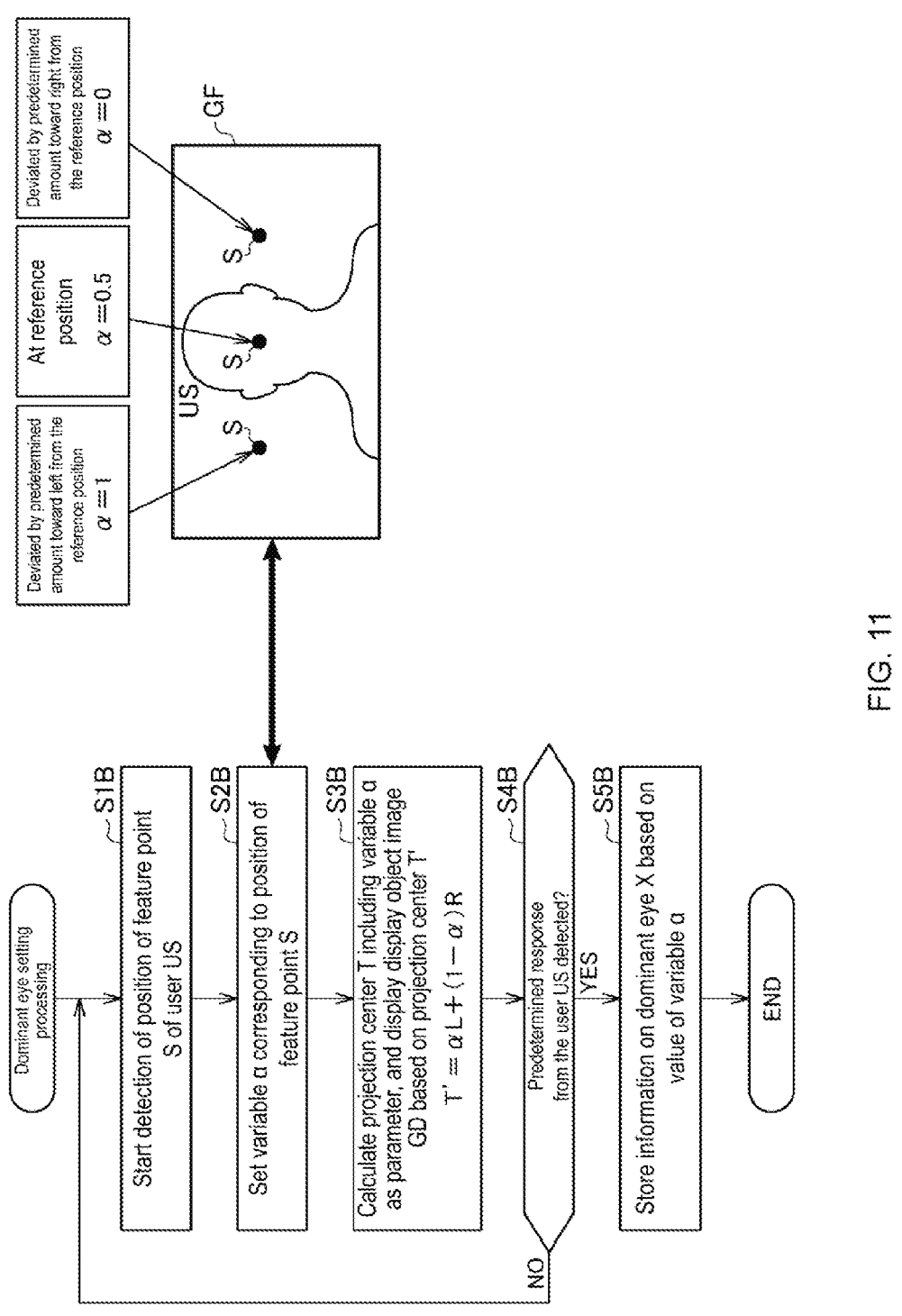
FIG. 11 is a flowchart illustrating dominant eye setting processing.

The dominant eye setting processing in Step S10A will be described with reference to FIG. 11.

In Step S1B, the dominant eye setting unit 45 detects the position of a feature point S with which the position of the user's face can be identified. The feature point S is a position that can be identified from the captured image GF from the internal camera 12 acquired through the input I/F 41, and can be any position with which the face of the user US can be identified. In the present embodiment, dominant eye setting unit 45 detects the position of the "middle point between both eyes" as the feature point S as illustrated in FIG. 11 by using the detection result of the user recognition device 20.

In Step S2B, the dominant eye setting unit 45 sets a variable α that changes according to the position of the feature point S. More specifically, when the feature point S is a reference position which is a general driving position of the user US, the variable α is set to a value of 0.5, and the variable α is set to approach a value of 0 as the feature point S deviates from the reference position toward one of the left and right sides, and the variable α is set to approach a value of 1 as the feature point S deviates from the reference position toward the other of the left and right sides. In this configuration, as illustrated in FIG. 11, when the feature point S deviates from the reference position toward the right by a predetermined amount, the variable α becomes a value of 0, and when the feature point S deviates from the reference position to the left by the predetermined amount, the variable α becomes a value of 1.

The predetermined amount is, for example, 10 cm, but may be appropriately set.

In Step S3B, the dominant eye setting unit 45 calculates a projection center T' including the variable α as a parameter, uses the image processing unit 46 to generate the display target image GD using the projection center T', and to cause the display unit 50 to display an image corresponding to the display target image GD.

Here, $$T' = \alpha L + (1 - \alpha)R. \qquad \text{Equation (4) holds}$$

In the equation, T' is a projection center for the dominant eye setting processing, Lis coordinates of the left eye, R is coordinates of the right eye, and T', L, and R are three dimensional coordinates with respect to the origin of the vehicle coordinate system.

As a result of the processing in Step S3B, the projection center T' corresponding to the position of the user US is set, and the display target image GD based on the set projection center T' is displayed on the display unit 50.

In Step S4B, the image generation device 40 executes predetermined notification processing for the user US, and determines whether a predetermined response from the user US is detected.

Here, the predetermined notification processing is processing of issuing a notification to the user US using display, sound, or the like, to request the user US to for the predetermined response in response to the image displayed on the display unit 50 and the image visually recognized through the front window 2W being at continuous positions.

For example, the predetermined response is a user action such as winking or nodding, or a user action that can be input via the UI 30 (utterance of voice corresponding to "OK" or operation of a predetermined operator).

When the predetermined response from the user US is not detected (Step S4B: NO), the image generation device 40 proceeds to the processing in Step S1B. Therefore, the processing in Steps S1B to S3B is repeatedly executed. Thus, when the user US moves at least his/her face toward the left or right, the projection center T' changes in the range between the right eye and the left eye, and the display target image GD corresponding to the changed projection center T' is displayed in real time.

When the predetermined response from user US is detected (Step S4B: YES), image generation device 40 stores information on the dominant eye X based on the value of the variable α in the storage unit 43, using the dominant eye setting unit 45. In general, since the dominant eye is either the left eye or the right eye, the variable α is predicted to be a value 0 or a value 1, and if the value is 0, information indicating that the dominant eye X is the right eye may be stored, and if the value is 1, information indicating that the dominant eye X is the left eye may be stored.

Alternatively, the dominant eye X may be determined to be the right eye when the variable α is equal to or greater than 0 and less than 0.5, and dominant eye X may be determined to be the left eye when the variable α is equal to or greater than 0.5 and less than 1.0. Alternatively, the dominant eye X may be determined to be the right eye if the variable α is equal to or greater than 0 and less than 0.3, the dominant eye X may be determined to be the left eye if the variable α is equal to or greater than 0.7 and less than 1.0, and the dominant eye X may not be determined and the dominant eye setting processing may be executed again if the variable $\alpha$ is equal to or greater than 0.3 and less than 0.7.

As the information on the dominant eye X, the value of the variable $\alpha$ itself, that is, the value of the variable $\alpha$ at the time when the predetermined response of the user US is detected may be stored in the storage unit 43. In this case, the projection center T may be calculated by substituting the stored variable $\alpha$ into Equation (4). Since the value of the variable $\alpha$ to be stored is not limited to the value 0 or the value 1, in other words, since the dominant eye is not limited to either the left eye or the right eye, it is easy to set the projection center T so that the user US does not actually feel unnaturalness. If there is a user US who can be regarded as having no dominant eye, the value of the variable $\alpha$ is stored as, for example, 0.5, and an appropriate projection center T can be set for the user US.

Expression (4) is an example of a mathematical expression and may be appropriately changed.

For example, when Equation (5) is employed instead of Equation (4), the dominant eye X may be determined to be the left eye if the variable $\alpha$ is a value of 0 to less than 0.5, and the dominant eye X may be determined to be the right eye if the variable $\alpha$ is a value of 0.5 or more to less than 1.0.

$$T' = (1 - \alpha)L + \alpha R \qquad \text{Formula (5)}$$

The reference range calculation processing in Step S4 will be described with reference to FIGS. 12 and 13.

Figure 12:
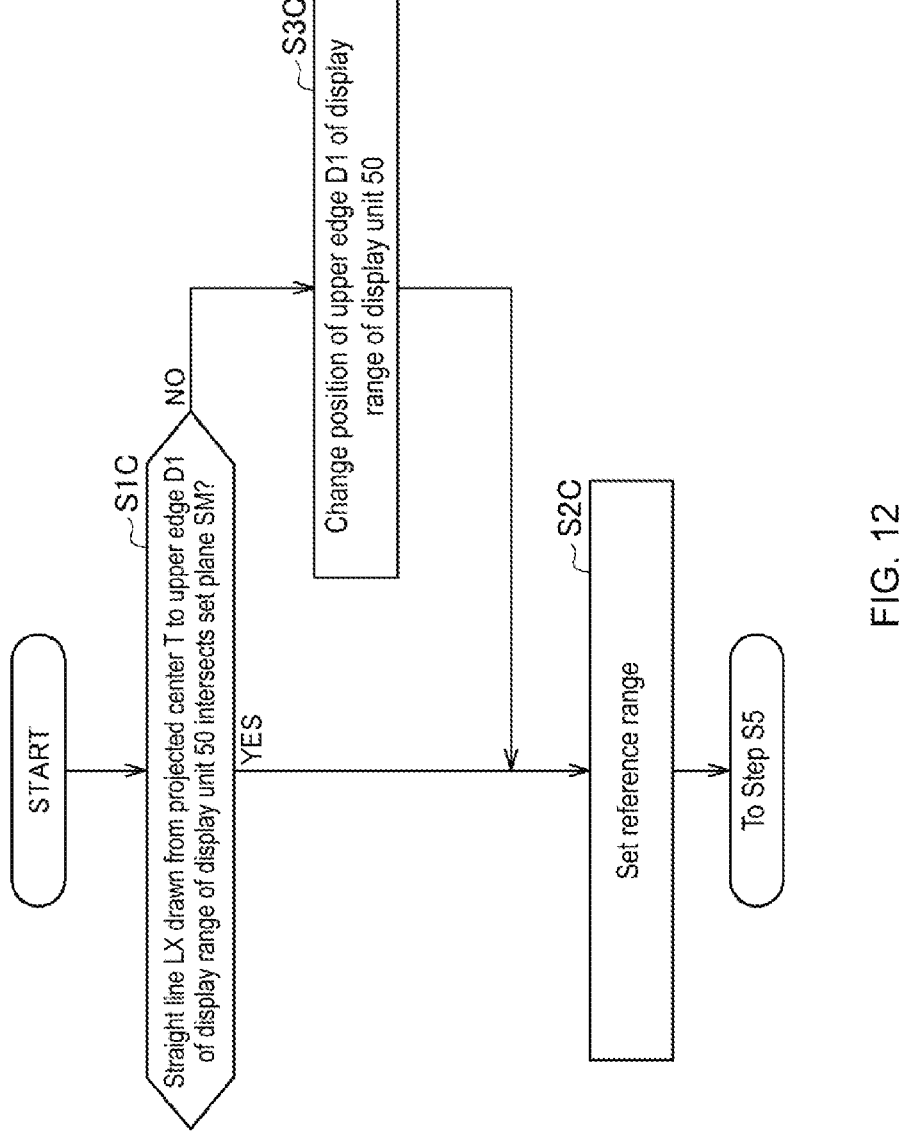
FIG. 12 is a flowchart illustrating reference range calculation processing.
Figure 13:
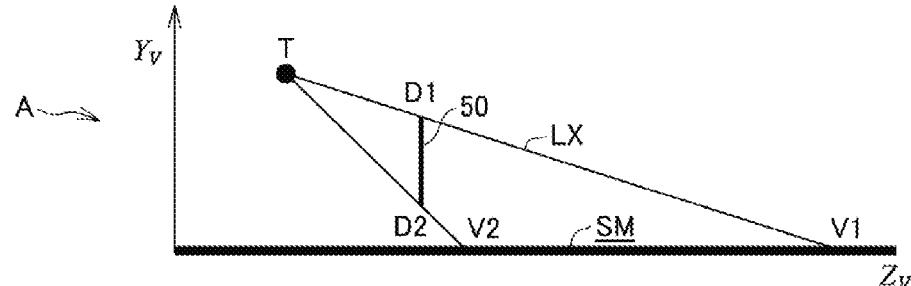
FIG. 13 is a diagram for explaining the reference range calculation processing.
Figure 13:
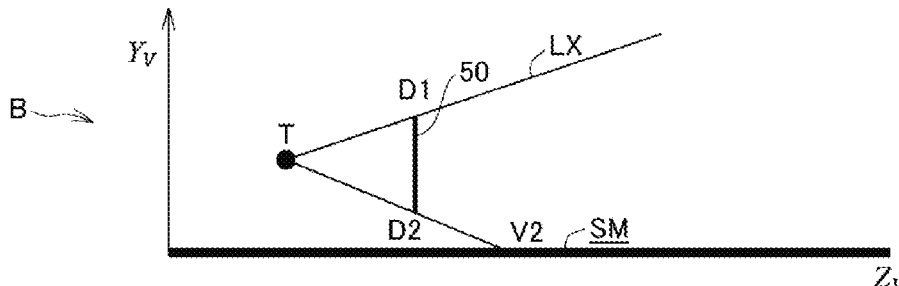
Figure 13:
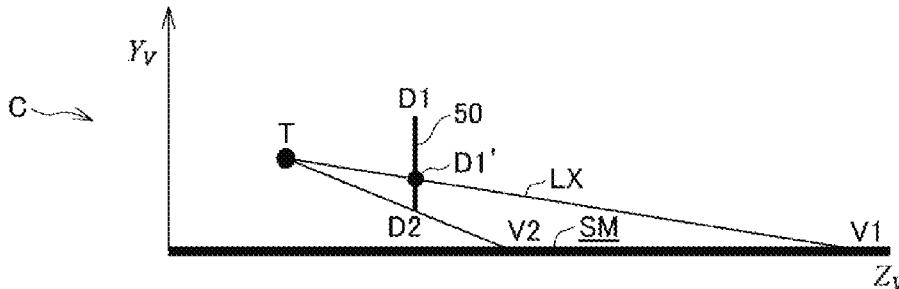

As illustrated in FIGS. 12 and 13, in Step S1C, the projection conversion unit 46B determines whether a straight line LX drawn from the projection center T to an upper edge D1 of the display range of the display unit 50 intersects the set plane SM.

As indicated by reference sign A in FIG. 13, when the straight line LX intersects the set plane SM, coordinates (corresponding to reference sign D1 in FIG. 13) on the set plane SM to be projected onto the upper edge V1 of the display unit 50 can be identified with reference to the projection center T. The projection center T and the coordinates on the set plane SM to be projected onto a lower edge D2 of the display range of the display unit 50 are indicated by reference sign V2 in FIG. 13.

Therefore, when the straight line LX intersects the set plane SM (Step S1C; YES), the projection conversion unit 46B can identify the range of the coordinates V1 to V2 corresponding to the reference range (Step S2C in FIG. 12).

On the other hand, when the position of the projection center T is lower than the upper edge D1 of the display range of the display unit 50 as indicated by reference sign B in FIG. 13, the straight line LX does not intersect the set plane SM. Thus, the coordinates on the set plane SM to be projected onto the upper edge D1 of the display unit 50 cannot be identified, and the reference range cannot be identified. For example, when the position of the eyes of the user US is lower than the display unit 50, there is a concern that the situation indicated by the reference sign B may occur. If the reference range cannot be identified, the display target image GD corresponding to the see-through image seen through the display unit 50 as viewed from the user US cannot be displayed.

Therefore, in the present embodiment, the projection conversion unit 46B executes processing of changing the position of the upper edge D1 of the display range of the display unit 50 to a position D1' where the straight line LX intersects the set plane SM, as indicated by reference sign C in FIG. 13 (processing in Step S3C in FIG. 12).

By executing the processing of changing to the position D1', the reference range can be identified (Step S2C in FIG. 12). Therefore, it is possible to generate the display target image GD based on the identified reference range, and it is possible to display, on the display unit 50, a see-through image that is seen through the display unit 50 as viewed from the user US. In this case, the display target image GD corresponding to the identified reference range corresponds to an image in a range between the position D1' and the lower edge D2 in the vertical display range of the display unit 50. Therefore, it is preferable to display the display target image GD in the range between the position D1' and the lower edge D2, and it is preferable to display an appropriate image (for example, a monochrome image) in the remaining range (the vertical range between the position D1' and the upper edge D1).

The position D1' may be set in various ways. For example, processing of setting a position lower than the projection center T by a predetermined height as the position D1' may be employed. According to this processing, the position D1' can be calculated easily and quickly. Processing may be employed in which a value is set that is lowered by a predetermined distance from the upper edge D1 until the straight line LX intersects the set plane SM, and the value at the time when the straight line LX intersects the set plane SM is set as the position D1'.

As described above, the image generation device 40 of the present embodiment acquires the captured image GC using the input I/F 41 functioning as the information acquiring unit, and displays the display target image GD on the display unit 50 using the display processing unit 47. The image generation device 40 uses the processor 42 or the input I/F 41 to acquire the projection conversion matrix M that enables the coordinates of the captured image GC to be converted from the coordinate system of the image to the coordinate system of the vehicle 2. The image generation device 40 uses the projection center identification unit 44 and the projection converting unit 46B which function as the reference range calculation unit to identify the projection center T, and calculate the reference range on the set plane SM to be projected to the display range of the display unit 50 based on the projection center T. Further, the image generation device 40 uses the processor 42 including the projection conversion unit 46B to calculate the projection conversion matrix N that enables conversion of the coordinates of the reference range from the coordinate system of the vehicle 2 to the coordinate system of the display unit 50. Then, the image generation device 40 uses the image generation unit 46C to generate the display target image GD using the projection conversion matrices M and N.

By using the projection conversion matrices M and N, highly-accurate coordinate conversion among the image coordinate system, the coordinate system of the vehicle 2, and the coordinate system of the display unit 50 is achieved. Therefore, it is possible to generate the display target image GD with high accuracy in accordance with the viewpoint of the user US who is the occupant, from the captured image GC. This allows the scenery that the user US sees through the front window 2W and the display target image displayed on the display unit 50 to be displayed continuously, as illustrated in FIG. 2. As a result, it is possible to display the see-through image capable of suppressing the unnaturalness felt by the user US who is the occupant.

The image generation device 40 uses the input I/F 41 to acquire the user information DU with which at least the position of the viewpoint of the user US can be identified. The image generation device 40 uses the projecting center identification unit 44 and the projecting conversion unit 46B which function as the reference range calculation unit to identify the projection center T based on the position of the viewpoint identified from the user information DU. This makes it easy to accurately identify the projection center T corresponding to the user US, and makes it easy to generate a highly accurate display target image GD in accordance with the viewpoint of the user US. In the present embodiment, since the user information DU enabling identification of at least the position of the viewpoint of the user US in real time is acquired and the image viewed from the user US is displayed in real time, it is possible to display an image suitable for driving support.

Although the user information DU input to the image generation device 40 is information indicating the recognition result of the user recognition device 20, the user information DU input to the image generation device 40 may be data of the captured image GF from the internal camera 12.

That is, in a case where the image generation device 40 includes a configuration corresponding to the user recognition device 20, the data of the captured image GF may be input from the outside. In this case, a configuration corresponding to the user recognition device 20 functions as an information acquisition unit that acquires user information DU with which the position of the viewpoint can be identified.

As illustrated in FIG. 13, when the straight line LX drawn from the projection center T1 to the upper edge D1 of the display range of the display unit 50 does not intersect the set plane, the image generation device 40 uses the projection center identification unit 44 and the projection conversion unit 46B to change the position of the upper edge D1 of the display range of the display unit 50 to the lowered position D1' so that the straight line LX intersects the set plane SM, and calculate the reference range corresponding to the changed display range. Here, the set plane is set to a traveling surface present at a position lower than the display range of the display unit 50. With this configuration, it is possible to avoid a situation in which the reference range cannot be calculated due to the position of the projection center T being lower than the upper edge D1 of the display range of the display unit 50. Therefore, it becomes easy to display the see-through image capable of suppressing the unnaturalness felt by the user US for the users US of various physiques, and it becomes easy to continuously display the see-through image capable of suppressing the unnaturalness felt by the user US even when the same user US takes various postures.

The image generation device 40 uses the dominant eye setting unit 45 to set the dominant eye X of user US, and uses the projection center identification unit 44 to set the projection center T at a position reflecting the dominant eye X. With this configuration, it is possible to display an image with less unnaturalness compared with a case where the dominant eye X is not reflected.

Since the image generation device 40 uses the projection conversion matrix N as the second conversion information that enables the coordinates of the reference range to be converted from the coordinate system of the vehicle 2 to the coordinate system of the display unit 50, the image of the display range of the display unit 50 can be easily acquired from the image of the reference range through the projection conversion.

The image generation device 40 uses the projection conversion matrix M as the first conversion information that enables the coordinates of the captured image GF to be converted from the coordinate system of the image to the coordinate system of the vehicle 2, and thus can easily acquire the image in the range defined by the coordinate system of the vehicle from the captured image GF through the projection conversion.

In the present embodiment, the projection conversion matrix H that is a product of the projection conversion matrix N and the projection conversion matrix M is acquired, and the coordinates of the captured image GF are converted from the coordinate system of the vehicle 2 to the coordinate system of the display unit 50 using the projection conversion matrix H. Therefore, it is not necessary to separately execute arithmetic processing using the projection conversion matrix N and arithmetic processing using the projection conversion matrix M. This is advantageous in reducing the amount of arithmetic processing and shortening the time required for arithmetic processing.

The above-described embodiment merely exemplifies one embodiment of the present invention, and can be arbitrarily modified and applied without departing from the gist of the present invention.

For example, the location where the display unit 50 is placed is not limited to the dashboard and may be, for example, a pillar portion. The content displayed on the display unit 50 is not limited to the image in front of the vehicle, and depends on the positional relationship between the display device 50 and the user US. Therefore, when the display unit 50 is located on the side of the user US, an image including the side of the vehicle is displayed on the display unit 50, and when the display unit 50 is located behind the user US, an image including the rear side of the vehicle is displayed on the display unit 50.

The number of external cameras 11 to be used is not limited to one, and a plurality of external cameras 11 may be used. The captured images from a front camera capturing the image on the forward side of the vehicle and a pair of left and right side cameras of the vehicle capturing the sides of the vehicle may be combined and mapped. Thus, it is possible to acquire the display target image GD in which the image of the side surface not captured by the front camera is mapped.

The image of the external camera 11 to be used is not limited to a real-time image, and may be a combination of past images. Accordingly, it is possible to acquire the display target image GD in which the image below the front hood or the bonnet of the vehicle or the image below the tire is mapped.

In the above-described embodiment, the case where the present invention is applied to the image generation device 40 illustrated in FIG. 1 and the control program DP of the image generation device 40 is described, but the present invention is not limited thereto. The information processing device of the present invention may include at least a configuration related to the displaying by the image generation device 40, and may include all the configurations of the display control system 1 or may not include part of the configurations of the image generation apparatus 40 within the range.

FIG. 1 is a schematic diagram illustrating components classified according to main processing contents in order to facilitate understanding of the present invention. The components can further be classified into more components according to processing contents. In addition, one component can be classified so as to execute more processing.

Furthermore, processing by each functional unit may be executed by single hardware or by a plurality of hardware units. The processing by each component may be realized by one program or may be realized by a plurality of programs.

The processing units of the flowcharts illustrated in the drawings are divided according to the main processing contents. Note that the embodiments are not limited by the manner in which the processing units of the flowcharts are divided or names thereof. Furthermore, the order of processing in the flowchart described above is also not limited to the illustrated example.

When the control program DP of the present invention is realized by a computer, the control program DP may be configured in the form of a recording medium or a transmission medium for transmitting the program. The recording medium may be a magnetic or optical recording medium or a semiconductor memory device. Specifically, the recording medium includes a flexible disk, a hard disk drive (HDD), a compact disk read only memory (CD-ROM), a digital versatile disk (DVD), a Blu-ray (registered trademark) disc, and a magneto-optical disk. The recording medium may also include a portable recording medium such as a flash memory or a card-type recording medium, and a fixed recording medium. In addition, the recording medium may be a nonvolatile storage device such as a RAM, a ROM, or an HDD which is an internal storage device included in the display device.

DESCRIPTION OF REFERENCE NUMERALS

1 Display control system
2 Vehicle (moving body)
2W Front window
10 Image capturing device
11 External camera (information acquisition unit)
12 Internal camera
20 User recognition device (information acquisition unit)
21 Face recognition unit
22 Viewpoint detection unit
30 User interface
40 Image generation device (information processing device)
41 Input interface (information acquisition unit, first conversion information acquisition unit)
42 Processor (first conversion information acquisition unit)
43 Storage unit
44 Projection center identification unit (reference range calculation unit)
45 Dominant eye setting unit (reference range calculation unit)
46 Image processing unit
46A Lens correction unit
46B Projection conversion unit (reference range calculation unit, second conversion information acquisition unit)
46C Image generation unit
47 Display processing unit
50 Display unit
T Projection center
N Projection conversion matrix (first conversion information)
M Projection conversion matrix (second conversion information)
SM Set surface (ground surface, traveling surface)
US User (occupant, driver)

The invention claimed is:

1. An information processing device comprising:
an information acquisition unit configured to acquire a captured image of a surrounding of a moving body;
a display processing unit configured to make a display unit viewable by an occupant of the moving body, display a display target image;
a first conversion information acquisition unit configured to acquire first conversion information enabling conversion of coordinates of the captured image from an image coordinate system into a coordinate system of the moving body;
a reference range calculation unit configured to identify a projection center corresponding to a viewpoint of the occupant of the moving body, and calculate a reference range on a set plane set by the coordinate system of the moving body to be projected in a display range of the display unit, based on the projection center;
a second conversion information acquisition unit configured to calculate second conversion information enabling conversion of coordinates of the reference range from the coordinate system of the moving body into a coordinate system of the display unit; and
an image generation unit configured to calculate each pixel value in a display range of the display unit from each pixel value of the captured image corresponding to the reference range by using the first conversion information and the second conversion information, and generate the display target image by using each pixel value calculated.

2. The information processing device according to claim 1, wherein the information acquisition unit acquires user information enabling identification of at least a position of a viewpoint of the occupant, and
the reference range calculation unit identifies the projection center based on the position of the viewpoint identified from the user information.

3. The information processing device according to claim 1, wherein when a straight line drawn from the projection center to an upper edge of the display range of the display unit does not intersect the set plane, the reference range calculation unit changes a position of the upper edge of the display range of the display unit to a lowered position to make the straight line intersects the set plane, and calculates a reference range corresponding to the changed display range.

4. The information processing device according to claim 3, wherein the set plane is set to a traveling surface present at a position lower than the display range of the display unit.

5. The information processing device according to claim 1 further comprising a dominant eye setting unit configured to set a dominant eye of the occupant, wherein
the reference range calculation unit sets the projection center at a position reflecting the dominant eye of the occupant.

6. The information processing device according to claim 1, wherein the first conversion information and the second conversion information are projection conversion matrices.

7. A non-transitory computer readable medium storing computer-executable instructions executed by a processor, the computer-executable instructions comprising:
acquiring a captured image of a surrounding of a moving body;
making a display unit viewable by an occupant of the moving body, displaying a display target image;

acquiring first conversion information enabling conversion of coordinates of the captured image from an image coordinate system into a coordinate system of the moving body;

identifying a projection center corresponding to a viewpoint of the occupant of the moving body, and calculating a reference range on a set plane set by the coordinate system of the moving body to be projected in a display range of the display unit, based on the projection center;

calculating second conversion information enabling conversion of coordinates of the reference range from the coordinate system of the moving body into a coordinate system of the display unit; and calculating each pixel value in a display range of the display unit from each pixel value of the captured image corresponding to the reference range by using the first conversion information and the second conversion information, and generating the display target image by using each pixel value calculated.

* * * * *